US011518476B2

(12) United States Patent
Su et al.

(10) Patent No.: US 11,518,476 B2
(45) Date of Patent: Dec. 6, 2022

(54) MULTI-SPEED HUB GEAR (71) Applicant: Sun Race Sturmey-Archer Inc., Taoyuan (TW)

(72) Inventors: Hsing-Yang Su, Taoyuan (TW); Chia-Sheng Huang, Taoyuan (TW)

(73) Assignee: SUN RACE STURMEY-ARCHER INC., Taoyuan (TW)

( * ) Notice: Subject to any disclaimer, the term of this patent is extended or adjusted under 35 U.S.C. 154(b) by 143 days.

(21) Appl. No.: 17/104,219

(22) Filed: Nov. 25, 2020

(65) Prior Publication Data

US 2021/0155319 A1 May 27, 2021

(30) Foreign Application Priority Data

Nov. 27, 2019 (TW) .................. 108143066

(51) Int. Cl.
*B62M 11/16* (2006.01)
(52) U.S. Cl.
CPC .................. *B62M 11/16* (2013.01)
(58) Field of Classification Search
CPC .......... B62M 11/16; F16D 41/24; F16D 11/14
See application file for complete search history.

(56) References Cited

U.S. PATENT DOCUMENTS 7,806,798 B2 * 10/2010 Fukui ..................... B62M 11/16
475/297
10,279,623 B2 * 5/2019 Yamamoto ............. B62M 11/18

FOREIGN PATENT DOCUMENTS

TW        I236445 B       7/2005

* cited by examiner

*Primary Examiner* — Erin D Bishop
(74) *Attorney, Agent, or Firm* — Locke Lord LLP; Tim Tingkang Xia, Esq.

(57) ABSTRACT

A multi-speed hub gear includes an axle, a planetary gear set, a clutch, a transmission member, a guide wheel, a compressed clutch spring, a shift mechanism and a torsional spring. While in switching a low gear to a high gear, the shift mechanism transforms a rotational motion into a linear motion for twisting the torsional spring. The compressed clutch spring pushes the clutch to displace from the transmission member toward the planetary gear set. While in switching the high gear to the low gear, the torsional spring drives the shift mechanism to transform the rotational motion into the linear motion, such that the clutch can displace from the planetary gear set toward the transmission member, and compress the compressed clutch spring.

7 Claims, 10 Drawing Sheets

MULTI-SPEED HUB GEAR

CROSS REFERENCE TO RELATED APPLICATION

This application claims the benefits of Taiwan application Serial No. 108143066, filed Nov. 27, 2019, the disclosures of which are incorporated by references herein in its entirety.

TECHNICAL FIELD

The present disclosure relates in general to a multi-speed hub gear.

BACKGROUND

A speed-variable bicycle allows its rider to choose between a low gear and a high gear by controlling a derailleur. Generally, the low gear is selected for riding uphill, and the high gear is selected for riding downhill. Thus, the bicycle riding can achieve a purpose of saving effort on an uphill ride and saving time on a downhill ride.

In the art, a variable speed hub structure for bicycle, disclosed in a Taiwan invention patent with a publication number TW I236445, includes mainly an axle, a driver, a hub shell, a planetary gear train, a clutch and a shift mechanism for manipulating the clutch. When the driver is purposely operated to pull a shift cable for rotating a rotate-control interface, then simultaneously a shift actuator fixed with the rotate-control interface would be rotated as well. At this time, a follower sleeve would proceed a linear motion along a sliding slot of the axle without any rotation. As such, gear shifting by pushing and displacing the clutch can be achieved. However, in this same invention patent, as the low gear is shifted to a high gear, a load-to-weight ratio for gear shift would be increased. Thus, the gear shift simply by displacing the clutch (i.e., by sliding the follower sleeve along the sliding slot of the axle) would easily result in a hindered shifting, from which wear upon the follower sleeve and the related parts would be somehow accelerated.

Thus, an improved multi-speed hub gear that can overcome the aforesaid shortcomings is definitely welcome and urgent in the art.

SUMMARY

An object of this disclosure is to provide a multi-speed hub gear that can enhance operational smoothness in shifting gear by improving coordination between components.

In one embodiment of this disclosure, the multi-speed hub gear applies a shift lever to shift gears between a high gear and a low gear, in which the shift lever is connected with a shift cable. The multi-speed hub gear includes an axle, a planetary gear set, a clutch, a transmission member, a guide wheel, a compressed clutch spring, a shift mechanism and a torsional spring. The planetary gear set, the clutch, the transmission member and the guide wheel are orderly mounted to the axle. The guide wheel is used for connecting the shift cable. The clutch is disposed between the planetary gear set and the transmission member. The compressed clutch spring is connected with the clutch. The shift mechanism is used for transforming a rotational motion into a linear motion. The torsional spring is rotationally connected with the shift mechanism. While in switching the low gear to the high gear, the shift lever pulls tightly the shift cable to rotate the shift mechanism in a first rotational direction for driving the shift mechanism to transform the rotational motion into the linear motion and thus to twist the torsional spring, such that the compressed clutch spring pushes the clutch to displace in a first displacement direction from the transmission member toward the planetary gear set. While in switching the high gear to the low gear, the shift lever loosens the shift cable to have the torsional spring to rotate the shift mechanism in a second rotational direction to transform the rotational motion into the linear motion and thus to displace the clutch in a second displacement direction from the planetary gear set toward the transmission member and to further compress the compressed clutch spring, the first rotational direction and the second rotational direction are reverse to each other, and the first displacement direction and the second displacement direction are linear and reverse to each other.

In one embodiment of this disclosure, the multi-speed hub gear further includes a unidirectional clutch disposed between the clutch and the planetary gear set.

In one embodiment of this disclosure, the multi-speed hub gear further includes a clutch ratchet and a plurality of pawls, the clutch includes a lateral protrusion, and the planetary gear set includes a planet carrier and a planet gear. The planet gear is rotationally connected with and disposed inside the planet carrier, the clutch ratchet is disposed at one side of the planet carrier, each of the plurality of pawls is pivotally connected with the planet carrier for buckling a corresponding ratchet groove of the clutch ratchet, and the lateral protrusion of the clutch is used for engaging a corresponding cavity of the clutch ratchet.

In one embodiment of this disclosure, the multi-speed hub gear further includes a ring gear. The clutch is disposed inside the ring gear. The ring gear includes a ring gear pawl for contacting the clutch to form a power input/output route corresponding to the low gear, and the power input/output route is formed by the transmission member, the ring gear, the planet gear and the planet carrier. If the ring gear pawl does not contact the clutch and the lateral protrusion of the clutch does not engage the cavity of the clutch ratchet, another power input/output route corresponding to the high gear is formed by including the transmission member, the clutch, the planet carrier and the ring gear.

In one embodiment of this disclosure, the shift mechanism includes a slip ring and a clutch cam. The slip ring, disposed inside the clutch, includes a ring body and at least a protrusive key. The protrusive key is extended from an inner surface of the ring body. The clutch cam, connected with the planetary gear set, includes at least a first cam surface and at least a second cam surface. The first cam surface is adjacent to the transmission member. The second cam surface is adjacent to the planetary gear set. The slip ring is rotationally disposed on an outer surface of the clutch cam. The protrusive key is used for sliding along the first cam surface or the second cam surface. While in switching the low gear to the high gear, the guide wheel drives the slip ring to rotate in the first rotational direction for performing the rotational motion to have the protrusive key to slide along the second cam surface from the first cam surface, and thus the slip ring displaces in the first displacement direction from the transmission member toward the planetary gear set so as to perform the linear motion. While in switching the high gear to the low gear, the torsional spring drives the slip ring to rotate in the second rotational direction to perform the rotational motion and to have the protrusive key to slide along the first cam surface from the second cam surface, and so the slip ring displaces in the second displacement direction from the planetary gear set toward the transmission member to perform the linear motion.

In one embodiment of this disclosure, the shift mechanism further includes a guide-wheel adapter and a slip-ring actuator. The guide-wheel adapter is co-moved with the guide wheel. The slip-ring actuator, movably disposed inside the clutch and co-moved with the guide-wheel adapter, includes at least a sliding slot for the protrusive key of the slip ring to slide therealong. The guide wheel rotates the guide-wheel adapter to further rotate the slip-ring actuator.

In one embodiment of this disclosure, the guide-wheel adapter includes an adapter body, a first connecting pillar and a second connecting pillar, the adapter body is connected between the first connecting pillar and the second connecting pillar, the first connecting pillar is connected with the guide wheel, and the second connecting pillar is used for engaging a corresponding positioning hole of the slip-ring actuator.

In one embodiment of this disclosure, the multi-speed hub gear further includes a bearing seat fixed to the axle. The bearing seat has an arc-shaped slot. The first connecting pillar orderly penetrates through the arc-shaped slot and the mounting hole of the guide wheel. When the guide wheel rotates, the guide-wheel adapter moves together with the guide wheel, and the first connecting pillar of the guide-wheel adapter is movable along the arc-shaped slot.

As stated above, in the multi-speed hub gear of this disclosure, since the shift mechanism utilizes a rotational motion to have the clutch to generate a corresponding linear displacement motion, while in shifting the low gear to the high gear, a compressed clutch spring can be used to displace the clutch so as to complete the gear shift. Thereupon, the effect of the load ratio for shifting the low gear to the high gear can be reduced. On the other hand, while in shifting the high gear to the low gear, a torsional spring can rotate reversely the components respective to the shift mechanism. That is, with the torsional spring to push and displace the clutch, the shifting smoothness from the high gear to the low gear can be substantially enhanced.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
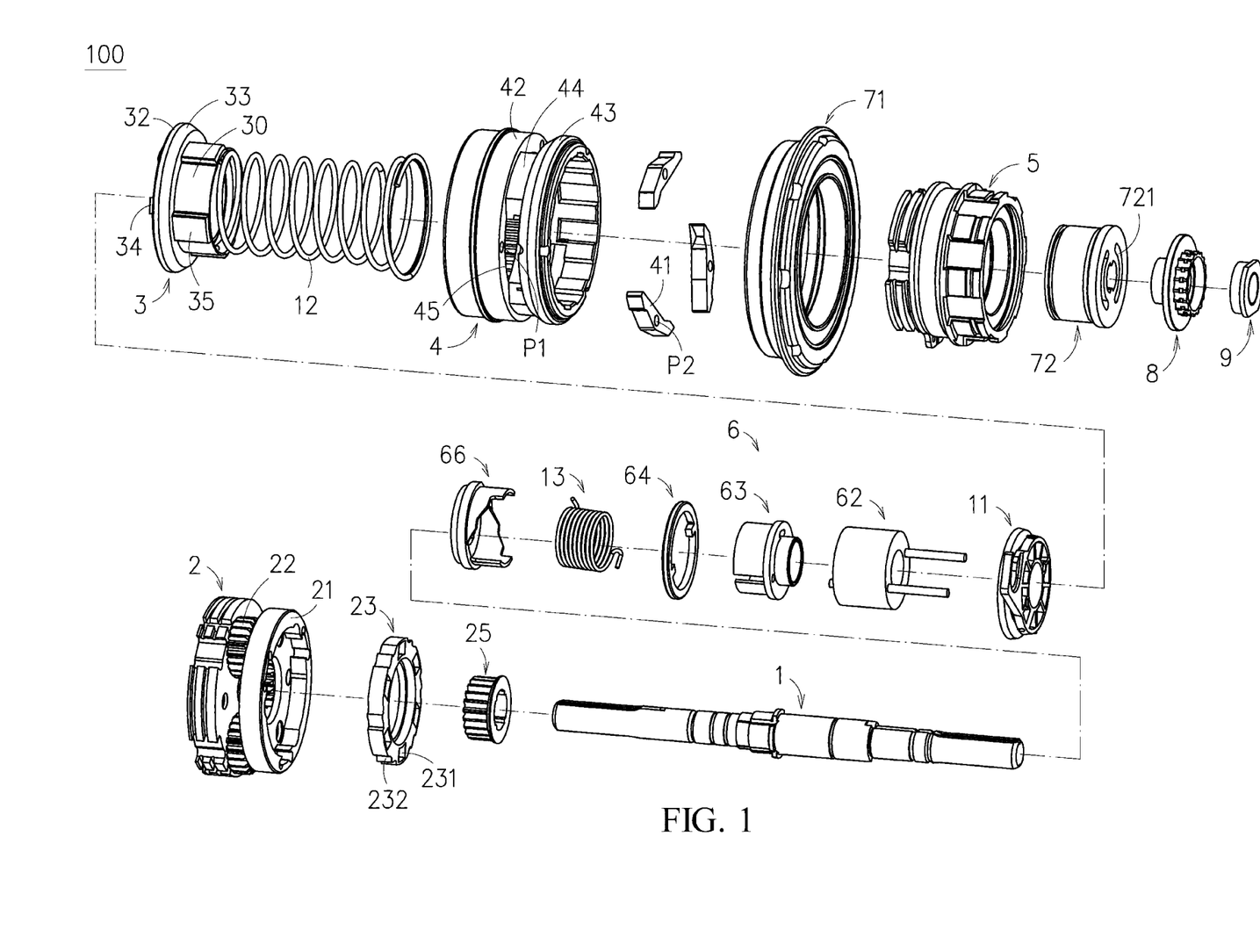
FIG. 1 is a schematic exploded view of a preferred multi-speed hub gear in accordance with this disclosure.
Figure 2A:
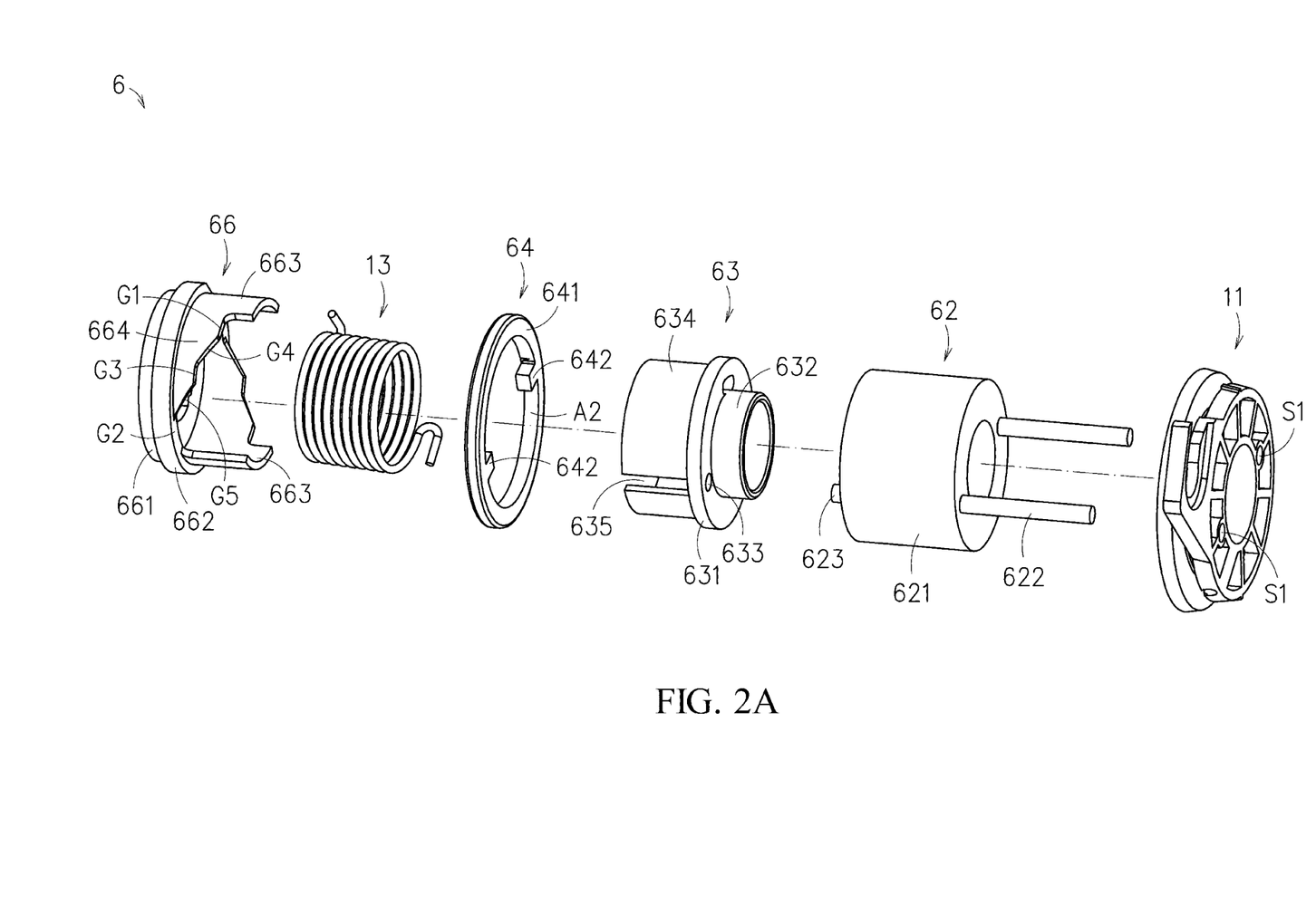
FIG. 2A is an enlarged view of the shift mechanism of FIG. 1.
Figure 2B:
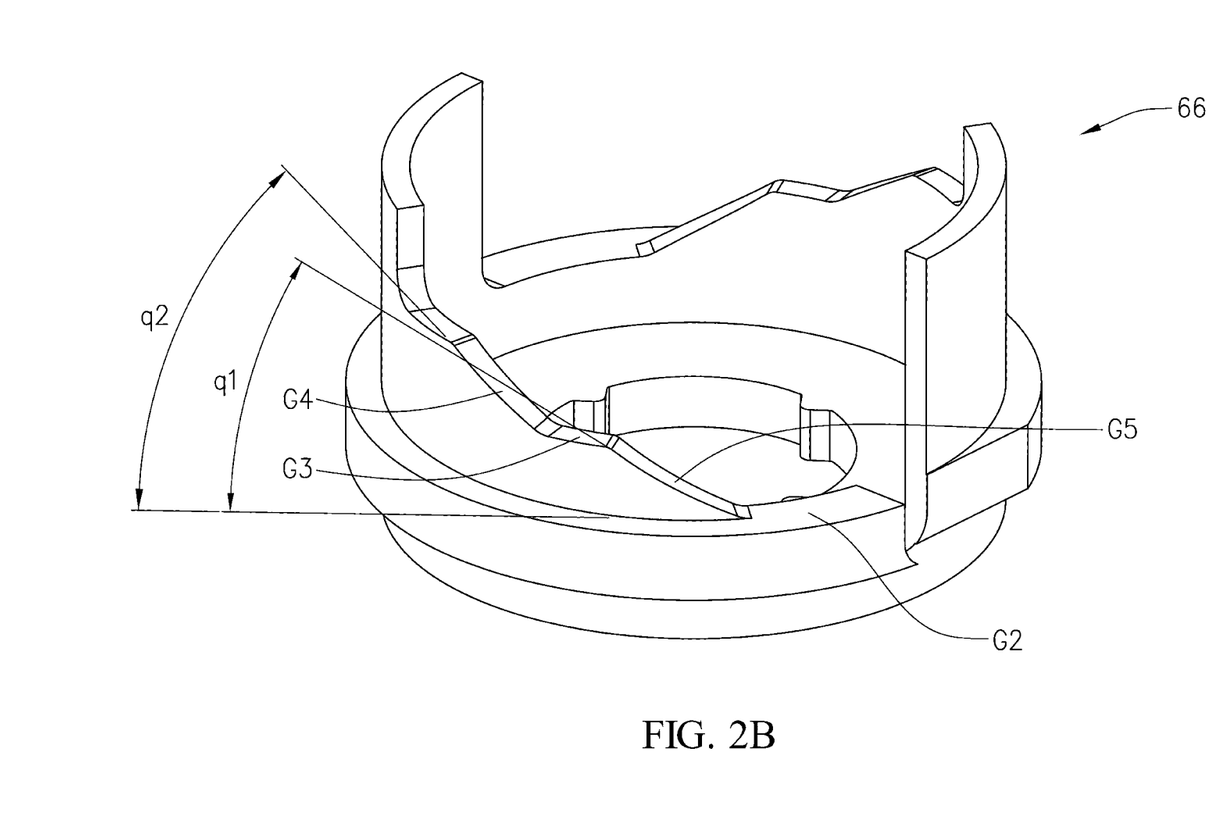
FIG. 2B shows schematically the clutch cam of FIG. 2A.
Figure 3A:
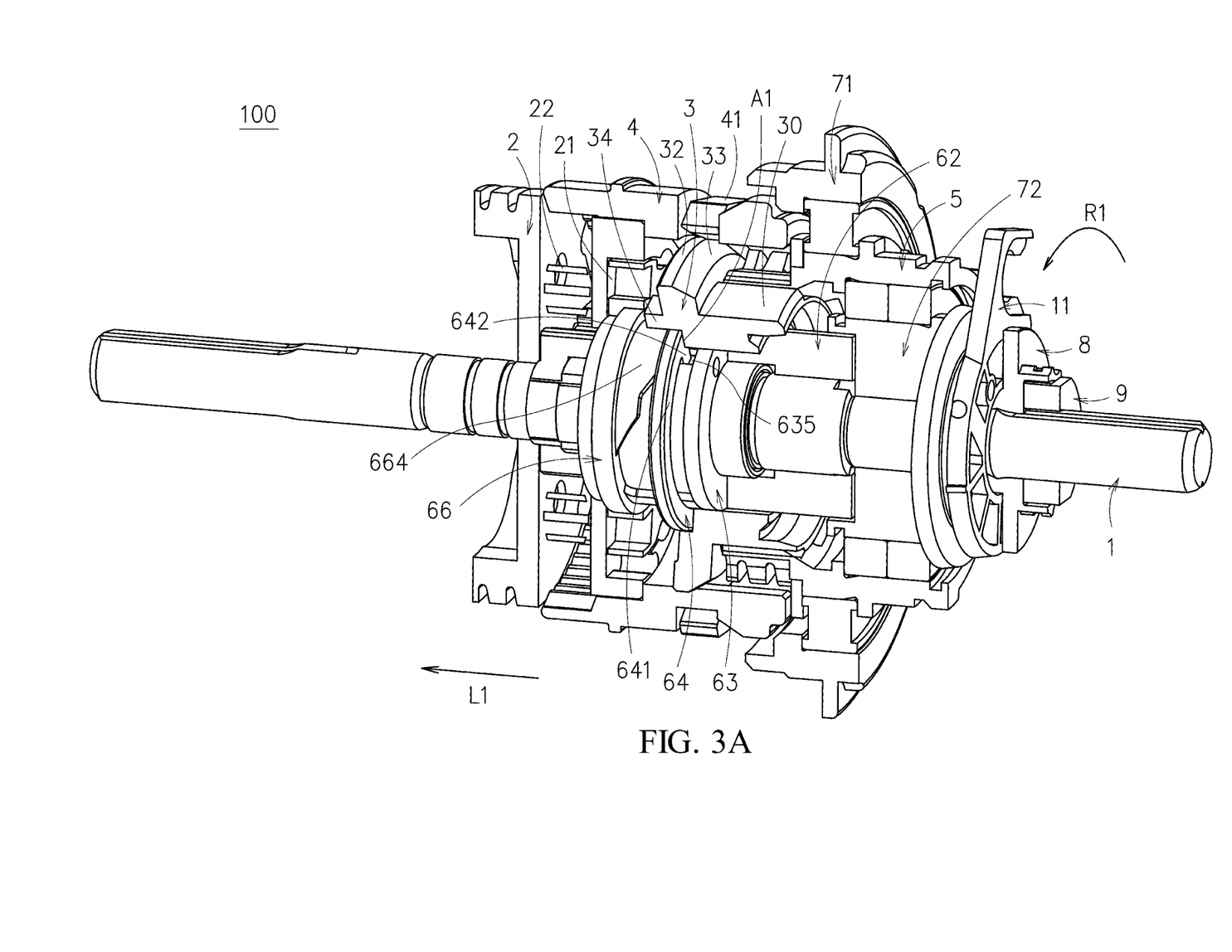
FIG. 3A is a schematic perspective cross-sectional view of the multi-speed hub gear of FIG. 1 at the first gear.
Figure 3B:
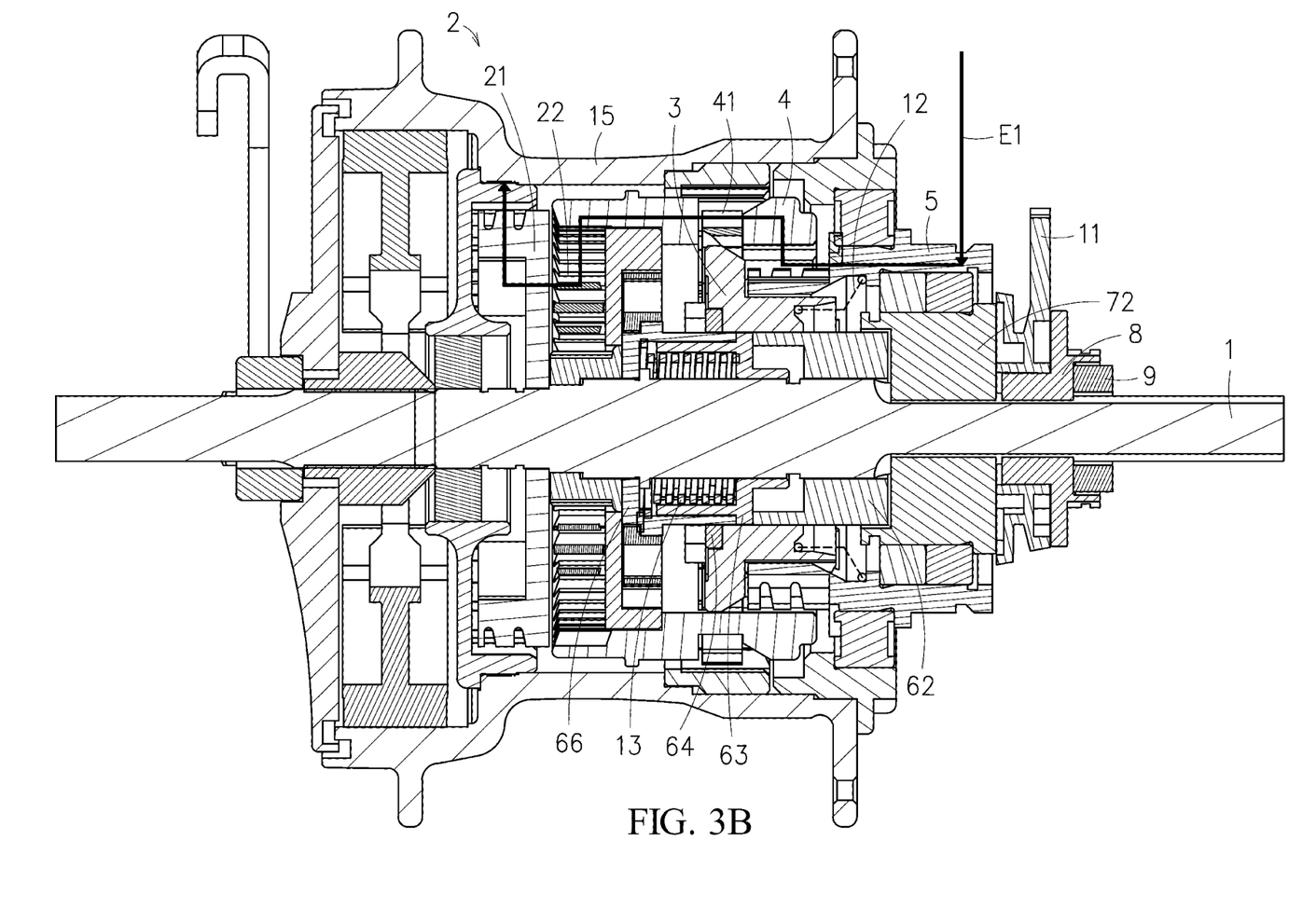
FIG. 3B is a schematic planar cross-sectional view of FIG. 3A.
Figure 4A:
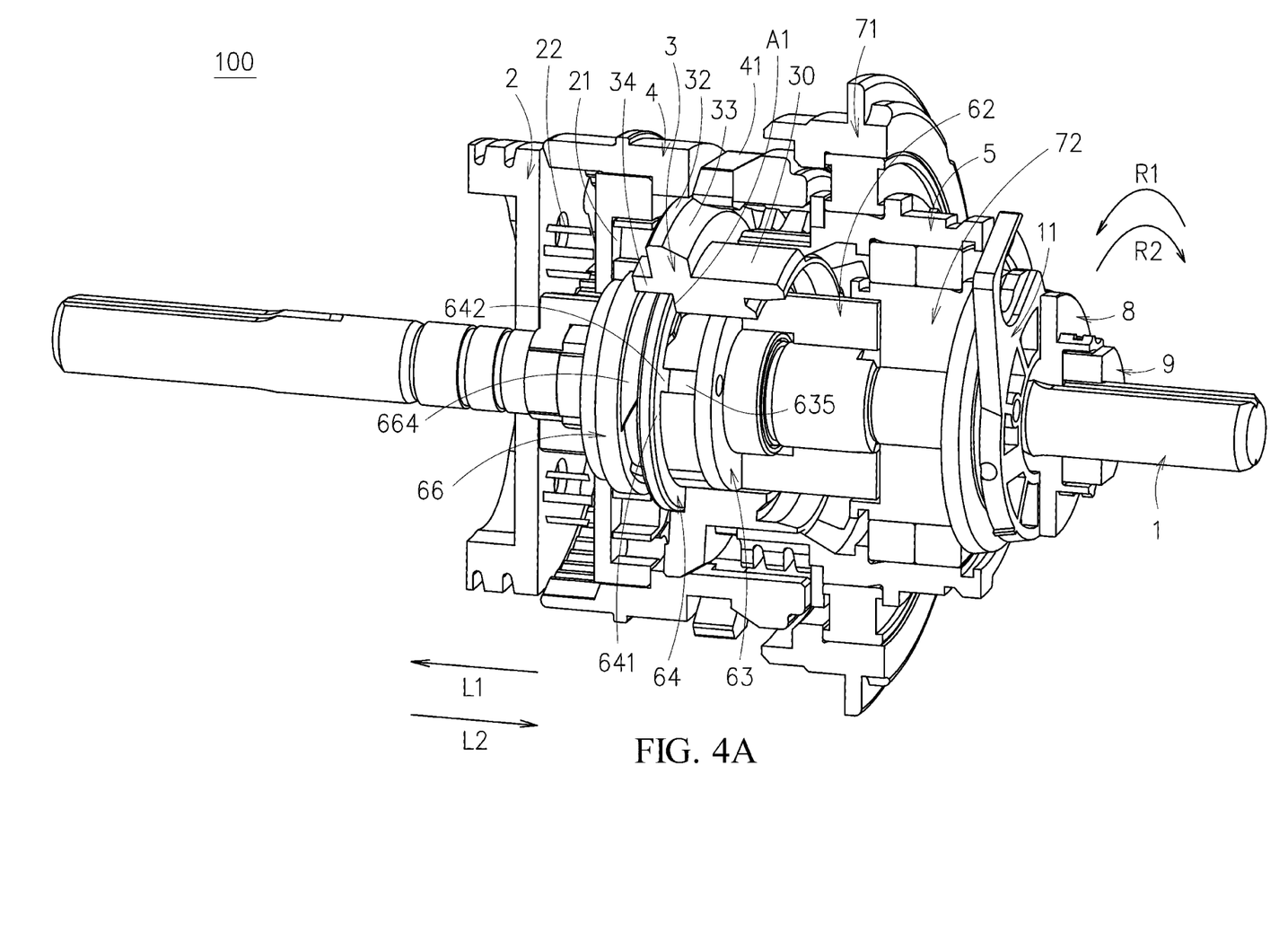
FIG. 4A is a schematic perspective cross-sectional view of the multi-speed hub gear of FIG. 1 at the second gear.
Figure 4B:
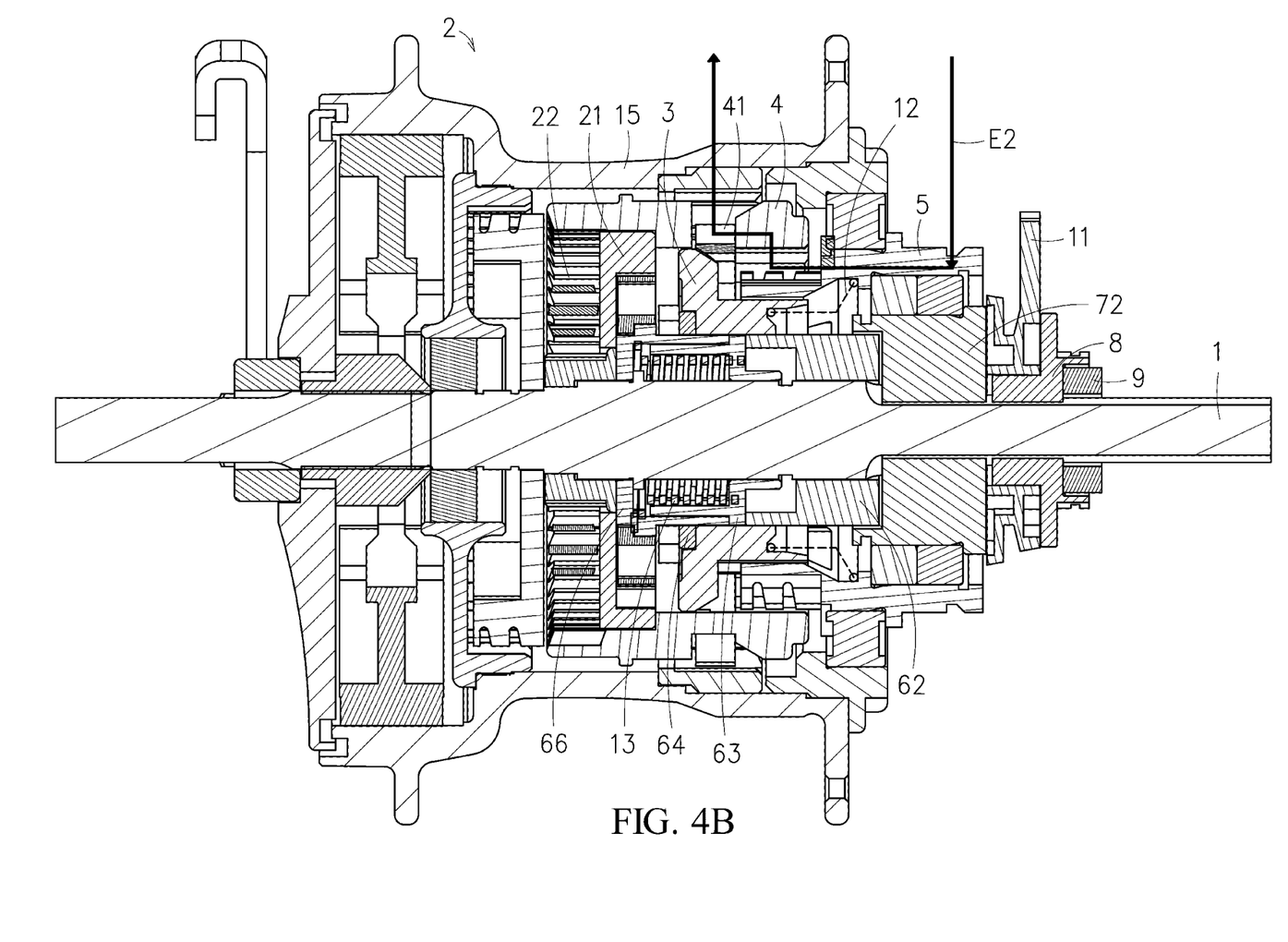
FIG. 4B is a schematic planar cross-sectional view of FIG. 4A.
Figure 5A:
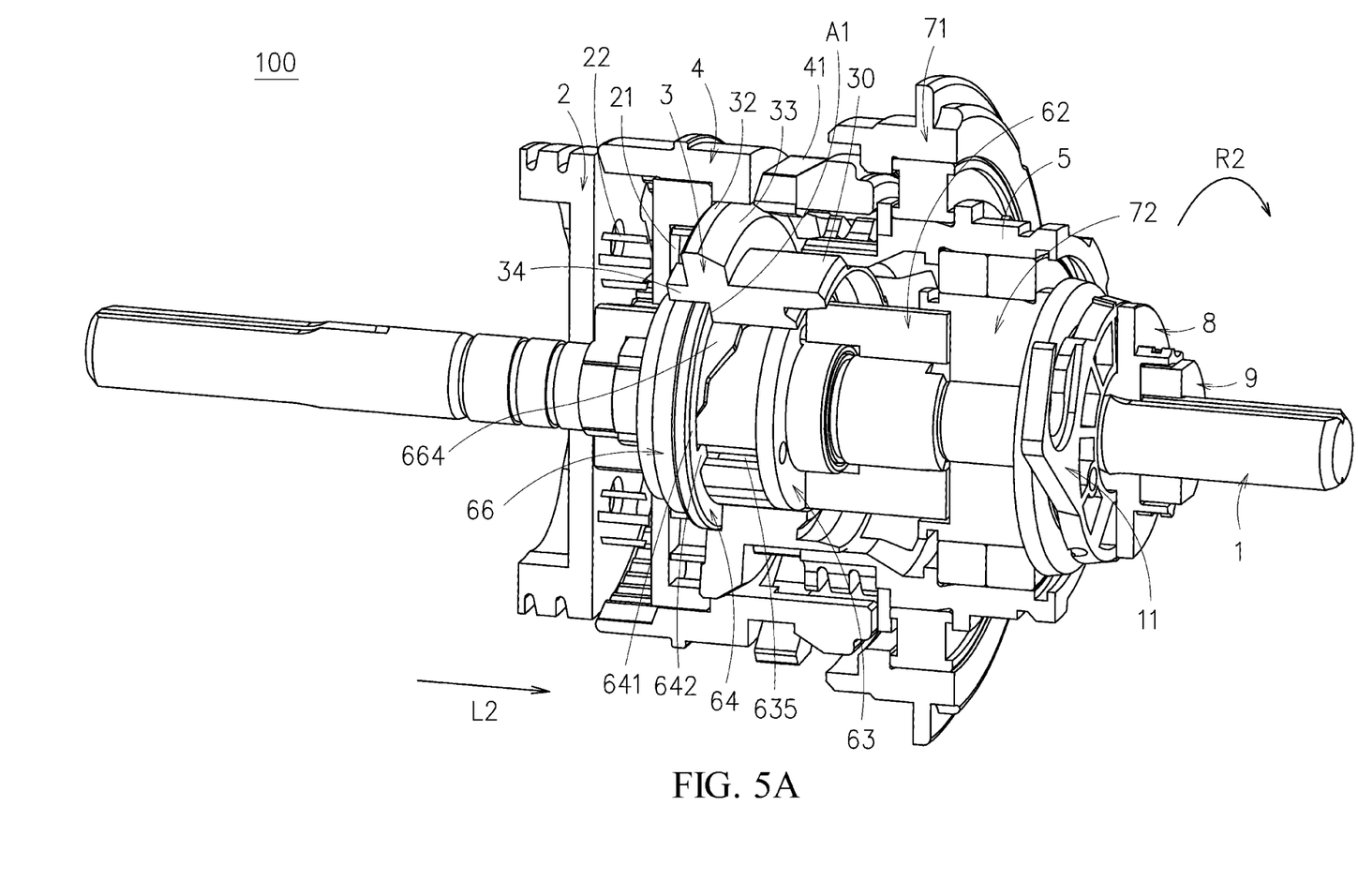
FIG. 5A is a schematic perspective cross-sectional view of the multi-speed hub gear of FIG. 1 at the third gear.
Figure 5B:
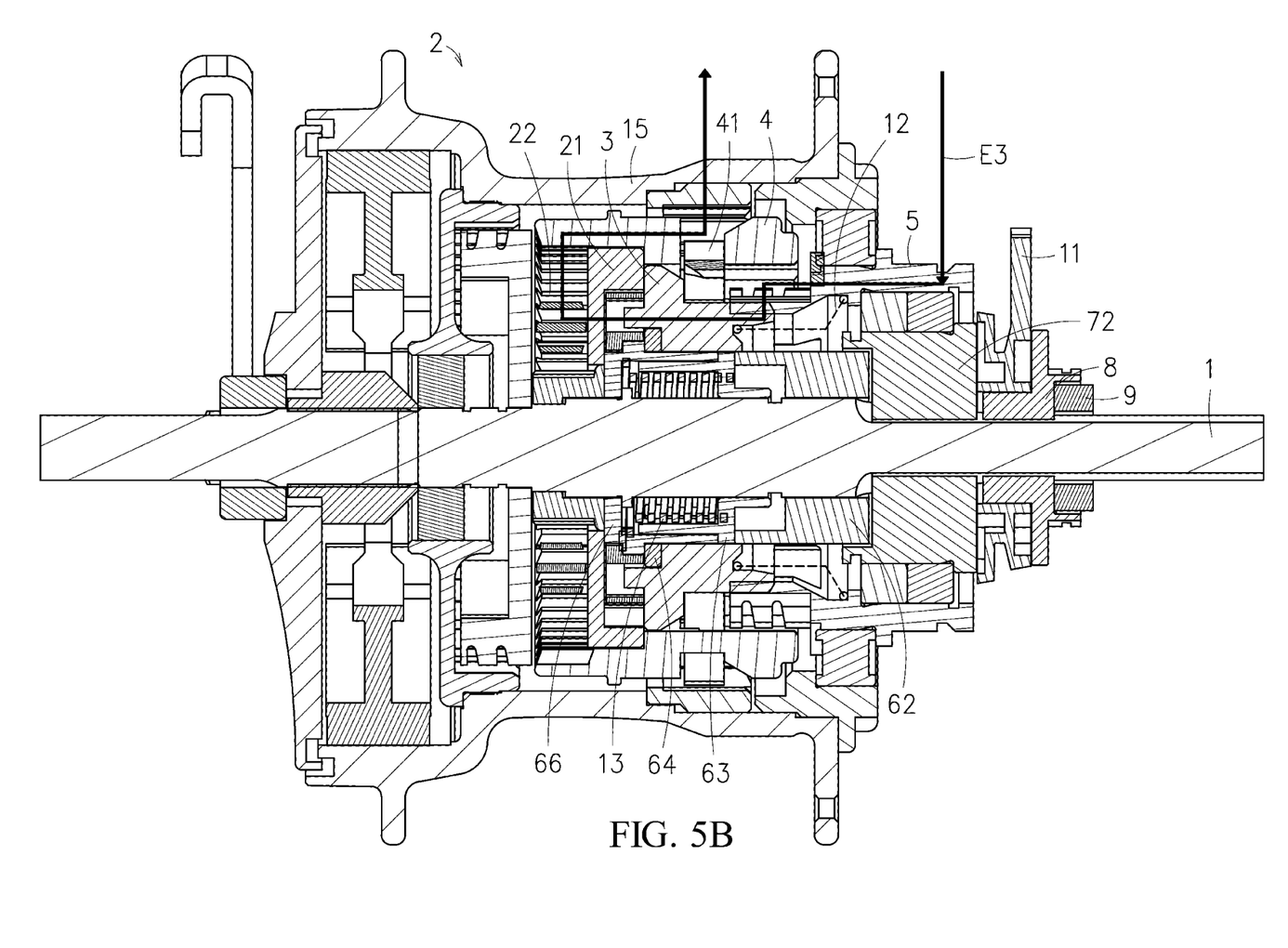
FIG. 5B is a schematic planar cross-sectional view of FIG. 5A.
Figure 6:
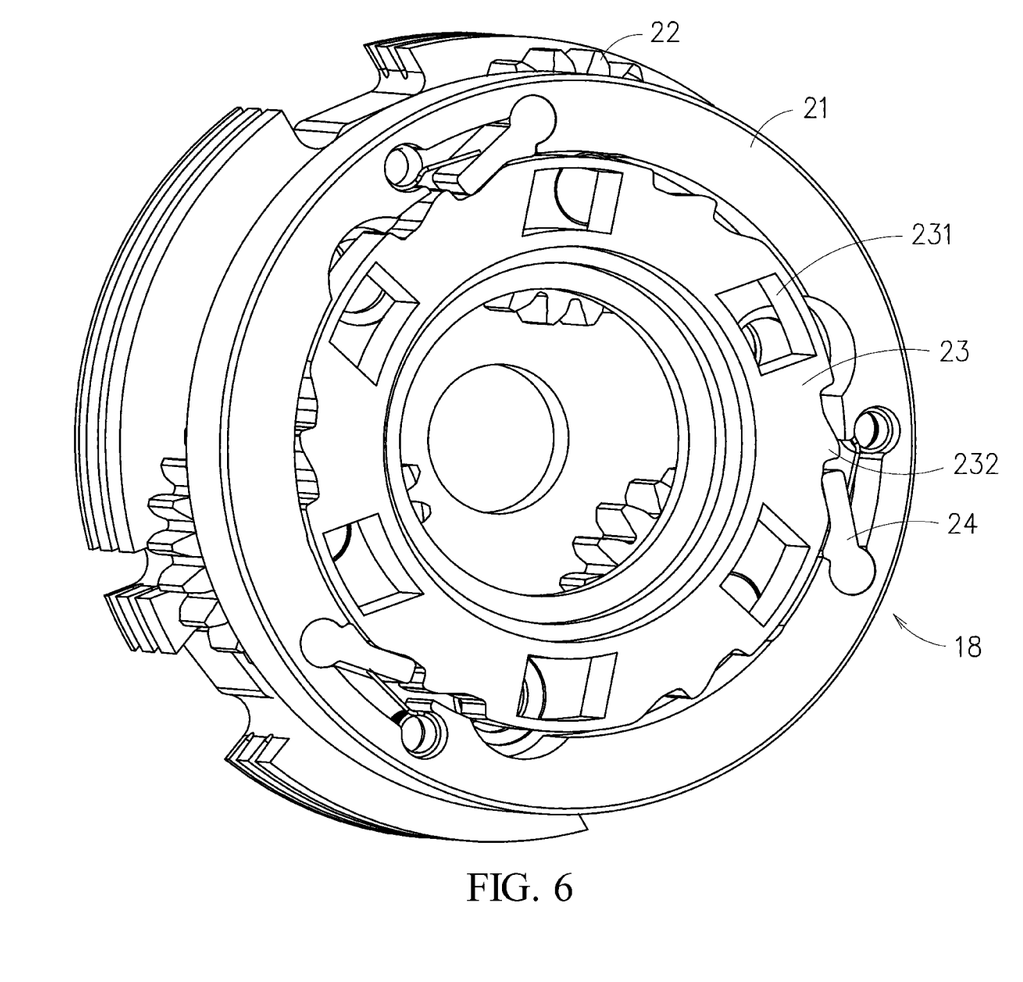
FIG. 6 is a schematic perspective view of a preferred unidirectional clutch in accordance with this disclosure.

Refer to FIG. 1 through FIG. 6; where FIG. 1 is a schematic exploded view of a preferred multi-speed hub gear in accordance with this disclosure, FIG. 2A is an enlarged view of the shift mechanism of FIG. 1, FIG. 2B shows schematically the clutch cam of FIG. 2A, FIG. 3A is a schematic perspective cross-sectional view of the multi-speed hub gear of FIG. 1 at the first gear, FIG. 3B is a schematic planar cross-sectional view of FIG. 3A, FIG. 4A is a schematic perspective cross-sectional view of the multi-speed hub gear of FIG. 1 at the second gear, FIG. 4B is a schematic planar cross-sectional view of FIG. 4A, FIG. 5A is a schematic perspective cross-sectional view of the multi-speed hub gear of FIG. 1 at the third gear, FIG. 5B is a schematic planar cross-sectional view of FIG. 5A, and FIG. 6 is a schematic perspective view of a preferred unidirectional clutch in accordance with this disclosure. As shown from FIG. 1 to FIG. 6, the multi-speed hub gear 100 applies a shift lever (not shown in the figure) to carry out gear shift between a high gear and a low gear. The shift lever is further connected with a shift cable (not shown in the figure). The multi-speed hub gear 100 includes at least an axle 1, a planetary gear set 2, a clutch 3, a ring gear 4, a transmission member 5, a shift mechanism 6, a guide wheel 11, a compressed clutch spring 12, a torsional spring 13 and a hub shell 15 (see FIG. 3B, FIG. 4B and FIG. 5B). All the axle 1, the planetary gear set 2, the clutch 3, the ring gear 4, the transmission member 5, the shift mechanism 6, the guide wheel 11, the compressed clutch spring 12 and the torsional spring 13 are disposed inside the hub shell 15.

In this embodiment, the planetary gear set 2, the clutch 3, the transmission member 5 and the guide wheel 11 are orderly mounted fixedly along the axle 1. The guide wheel 11 is used for connecting the shift cable. The clutch 3 is located between the planetary gear set 2 and the transmission member 5. The compressed clutch spring 12 is connected with the clutch 3. The torsional spring 13 is rotationally connected to the shift mechanism 6 that is used for transforming a rotational motion into a corresponding linear motion, such that the clutch 3 can be displaced to switch between a plurality of power input/output routes. For example, this embodiment includes three power input/output routes, including a first gear shown in FIG. 3A or FIG. 3B, a second gear shown in FIG. 4A or FIG. 4B, a third gear shown in FIG. 5A or FIG. 5B. Namely, in this embodiment, while the shift mechanism 6 drives the clutch 3 to displace, the gear would be orderly switched to the first gear, the second gear and the third gear, in which the first gear is a low gear (i.e., a speed-down gear), the third gear is a high gear (i.e., a speed-up gear), and the second gear is a gear for maintaining the input power to be equal to the output power (i.e., 1:1).

In this embodiment, as shown in FIG. 3A or FIG. 3B, the gear is shifted to the low gear (i.e., the first gear). While the low gear is shifted to the high gear, the shift lever is operated to pull tightly the shift cable so as to rotate the shift mechanism 6 in a first rotational direction R1, such that the shift mechanism 6 would transform a rotational motion into a linear motion by twisting the torsional spring 13. In this embodiment, the torsional spring 13 is a coil spring that can store twist energy in a form of shortening or stretching the length of the coil spring (depending on the direction of twisting). Thereupon, by having the compressed clutch spring 12 to push the clutch 3 to move in the first displacement direction L1 form the transmission member 5 to the planetary gear set, then the clutch 3 would be connected to the planetary gear set 2 to reach a state posing at the high gear as shown in FIG. 5A or FIG. 5B. Since the compressed clutch spring 12 is a coil spring against foreign compression or stretch. In other words, the compressed clutch spring 12 can provide internal back thrust to act against the foreign compression. While the low gear is shifted to the high gear, the compressed clutch spring 12 makes the clutch 3 to displace so as to switch the low gear to the high gear. Thereupon, influence of the load-to-weight ratio during the switching from the low gear to the high gear can be substantially reduced.

In this embodiment, as shown in FIG. 5A or FIG. 5B, the gear is shifted to the high gear (i.e., the third gear). Generally speaking, while the high gear is shifted to the low gear, since at that time the clutch 3 is connected with the planetary gear set 2, and thus if the clutch 3 is to be separated from the planetary gear set 2, then the transmission energy in the clutch 3 shall be released, otherwise friction would be generated. Or, thrust upon the clutch 3 shall be greater than the friction, otherwise while the high gear is shifted to the low gear during the ride, substantial wear might exist between the clutch 3 and the planetary gear set 2 or the related components. However, upon the arrangement of this embodiment, the shift lever is operated to loosen the shift cable, so that the potential energy previously stored in the torsional spring 13 can be released through untwisting the torsional spring 13. The untwisting torsional spring 13 rotates and elongates to resume the connected component back to its previous position. Namely, the torsional spring 13 drives the shift mechanism 6 to rotate in a second rotational direction R2, so that the rotational motion can be transformed into a linear motion. This linear motion would displace the clutch 3 in a second displacement direction L2 from the planetary gear set 2 toward the transmission member 5, such that the clutch 3 can leave the planetary gear set 2 to depress at the compressed clutch spring 12 so as to reach the low gear as shown in FIG. 3A or FIG. 3B. It shall be explained that the first rotational direction R1 and the second rotational direction R2 are opposing directions of the rotational motion, and the first displacement direction L1 and the second displacement direction L2 are opposing directions of the linear motion.

In addition, in riding a bicycle, upper and lower dead points would be met where the chain is unable to transmit the human power. At these points, friction of the chain would be comparatively low. In the art, an experienced rider would judge the riding situation and push the clutch 3 to switch the high gear to the low gear right at the dead point, so that the friction against the gear shift can be reduced to a minimum. However, in accordance with the embodiment of this disclosure, the concern of the friction for the gear shift does not exist anymore, and thus the gear shift according to this disclosure can be performed anytime during the riding. In shifting the gear according to this disclosure, the shift lever is loosened to release the torsional spring 13, so that the clutch 3 can be displaced to leave the planetary gear set 2, and so smoothness of the gear shift from the high gear to the low gear can be improved. Certainly, in riding a bicycle equipped with the derailleur of this disclosure, the gear-shift smoothness from the high gear to the lower gear can be further enhanced by performing the gear shift at the upper or lower dead point.

In this embodiment, referring to FIG. 1 and FIG. 6, the multi-speed hub gear 100 further includes a unidirectional clutch 18 disposed between the clutch 3 and the planetary gear set 2. The unidirectional clutch 18 is used for allowing rotations only in one same direction. Generally speaking, in a forward ride, the power transmission route is initiated at the transmission member 5. On the other hand, in a backward ride, the power transmission route is initiated at the hub shell 15. With the unidirectional clutch 18, the planetary gear set 2 can be free from any rotation by the initial power.

In one embodiment, the multi-speed hub gear 100 further includes a clutch ratchet 23 and a plurality of pawls 24, and the planetary gear set 2 includes a planet carrier 21, planet gears 22 and a sun gear 25. The sun gear 25 penetrated by the axle 1 is disposed inside the planet carrier 21. The planet gears 22 are individually connected with the planet carrier 21. The clutch ratchet 23 is disposed at one side of the planet carrier 21. The clutch 3 includes at least a lateral protrusion 34 engaged with the corresponding cavity 231 of the clutch ratchet 23, such that the clutch 3 can drive the planet carrier 21. One end of each of the pawls 24 is pivotally connected with the planet carrier 21, while another end thereof is used for buckling the corresponding ratchet groove 232 of the clutch ratchet 23. With the arrangement of the pawls 24 and the corresponding ratchet grooves 232, the clutch 3 or the planet carrier 21 can be allowed to rotate uni-directionally. Thus, in a direct pullback moment, rotation of the planet carrier 21 would not affect the power transmission route initiated by the hub shell 15, and so damages upon the related components can be avoided.

In this embodiment, the clutch 3 includes a main clutch body 30, a top portion 32, an inclined portion 33 and at least one lateral protrusion 34. The main clutch body 30 is a hollow cylindrical body having an external surface furnished with a plurality of ribs 35 extending in the axial direction. One end of the main clutch body 30 is connected with the compressed clutch spring 12, while another end thereof is connected with the inclined portion 33. The inclined portion 33 is further connected with the top portion 32. The smallest diameter of the inclined portion 33 is larger than an outer diameter of the main clutch body 30. As shown in FIG. 1, the top portion 32 and the inclined portion 33 are both axial extensions of the main clutch body 30 at the side opposing the compressed clutch spring 12. A diameter of the top portion 32 is larger than the largest diameter of the inclined portion 33. Namely, the inclined portion 33, located between the top portion 32 and the main clutch body 30, inclines from the top portion 32 to the main clutch body 30. The lateral protrusion 34 is protruded from one side of the top portion 32 by opposing the inclined portion 33.

In this embodiment, the clutch 3 is disposed inside the ring gear 4, and a bearing ring 71 is disposed outside the ring gear 4. The ring gear 4 includes at least one ring gear pawls 41, a first part 42 and a second part 43. Both the first part 42 and the second part 43 are respectively furnished with first setting holes P1. Each of the ring gear pawls 41 has a second setting hole P2. In addition, a plurality of connecting blocks 44 are provided to connect the first part 42 and the second part 43, and a gap 45 is formed to separate any two neighboring connecting blocks 44. Each of the ring gear pawls 41 is pivotally located in the corresponding gap 45 by having a pivot shaft (not show in the figure) to penetrate the second setting hole P2 and the two corresponding first setting holes P1 at the first part 42 and the second part 43.

In this disclosure, the shift mechanism 6 is used for transforming a rotational motion into a linear motion. In particular, as shown in FIG. 1 and FIG. 2A and FIG. 2B, the shift mechanism 6 of this embodiment includes a guide-wheel adapter 62, a slip-ring actuator 63, a slip ring 64 and a clutch cam 66. The guide wheel 11, disposed out of the transmission member 5 and between the adjuster 8 and the bearing seat 72, can be connected to a lever (not show in the figure) via a shift cable (not shown in the figure). The adjuster 8, penetrated through by the axle 1, is disposed between the guide wheel 11 and the fixed nut 9. The fixed nut, mounted fixedly on the axle 1, is used for compressing the adjuster 8.

The guide-wheel adapter 62 is co-moved with the guide wheel 11. As shown in FIG. 2A, the guide-wheel adapter 62 includes an adapter body 621, at least one first connecting pillar 622 and at least one second connecting pillar 623. The adapter body 621, as a hollow cylindrical body, is connected between the first connecting pillar 622 and the second connecting pillar 623. The first connecting pillar 622 is a protrusive structure extending axially from one end of the adapter body 621, the second connecting pillar 623 is also another protrusive structure extending axially from another end of the adapter body 621, and the first connecting pillar 622 is longer than the second connecting pillar 623. On the other hand, the bearing seat 72, fixed with the axle 1, has at least one arc-shaped slot 721 (see FIG. 1). The guide wheel 11 has at least one mounting hole S1. The first connecting pillar 622 is to penetrate orderly through the corresponding arc-shaped slot 721 and the corresponding mounting hole S1 of the guide wheel 11. That is, the guide-wheel adapter 62 and the guide wheel 11 are connected in a co-moving manner through the first connecting pillars 622. Then, as the guide wheel 11 rotates, the guide-wheel adapter 62 would rotate with the guide wheel 11, and the first connecting pillar 622 of the guide-wheel adapter 62 would slide along the corresponding arc-shaped slot 721 of the bearing seat 72.

The second connecting pillar 623 of the guide-wheel adapter 62 is used to engage a corresponding positioning hole 633 of the slip-ring actuator 63, such that the slip-ring actuator 63 can move together with the guide-wheel adapter 62. Namely, as the guide wheel 11 rotates, the guide-wheel adapter 62 would co-move with the guide wheel 11, and further the slip-ring actuator 63 can be rotated as well inside the clutch 3. In this embodiment, the slip-ring actuator 63 includes a disc body 631, an extension portion 632 and a base portion 634, in which the disc body 631 is connected between the extension portion 632 and the base portion 634. In addition, each of the disc body 631, the extension portion 632 and the base portion 634 are hollow parts. The disc body 631 is further furnished with at least one positioning hole 633. The extension portion 632 is plugged into the guide-wheel adapter 62. The positioning hole 633 is used for receiving and positioning the corresponding second connecting pillar 623 of the guide-wheel adapter 62, such that the guide-wheel adapter 62 and the slip-ring actuator 63 can rotate together without any slipping. On the other hand, the base portion 634 of the slip-ring actuator 63 is further furnished with at least one sliding slot 635 extending axially from the disc body 631 to the free end of the base portion 634. The sliding slot 635 is used for the corresponding protrusive key 642 of the slip ring 64 to slide therealong.

The slip ring 64, mounted inside the clutch 3 with direct contacting, includes a ring body 641 and at least a protrusive key 642. Each of the protrusive keys 642 is protruded radially from an inner surface A2 of the ring body 641. Shape and number of the protrusive keys 642 are the same as those of the sliding slots 635 of the slip-ring actuator 63. The protrusive key 642 of the slip ring 64 is to slide along the corresponding sliding slot 635 of the slip-ring actuator 63. As such, when the guide wheel 11 rotates, the guide-wheel adapter 62 would be rotated to further drive the slip-ring actuator 63 to rotate as well. Namely, through the sliding pair formed by the protrusive key 642 of the slip ring 64 and the corresponding sliding slot 635 of the slip-ring actuator 63, the slip ring 64 can rotate with the slip-ring actuator 63.

The clutch cam 66 is fixed to the axle 1, and thus indirectly connected to the planetary gear set 2. One end of the torsional spring 13 is connected with the clutch cam 66, while another end thereof is connected with the slip-ring actuator 63. In this embodiment, the torsional spring 13 is a coil spring for storing or releasing potential energy. While in releasing the potential energy of the torsion spring 13, a torque or a rotating force would be generated to resume the position of the component connected with the torsional spring 13. As shown in FIG. 2A and FIG. 2B, the clutch cam 66 includes a plurality of cam surfaces; i.e., a first cam surface G1, a second cam surface G2 and a third cam surface G3. An axial distance (i.e., a distance along the extending direction of the axle 1) between the second cam surface G2 and the transmission member 5 is greater than an axial distance between the first cam surface G1 and the transmission member 5, and an axial distance between the first cam surface G1 and the planetary gear set 2 is greater than an axial distance between the second cam surface G2 and the planetary gear set 2. The third cam surface G3 is disposed between the first cam surface G1 and the second cam surface G2.

In detail, the clutch cam 66 includes a first base portion 661, a second base portion 662, two protruding portions 663 and two stair portions 664. The first base portion 661 is constructed with the second base portion 662, and the second base portion 662 has a diameter larger than that of the first base portion 661. The clutch cam 66 is fixed to the axle 1 through the first base portion 661 and the second base portion 662. Each of the two protruding portions 663 is extended axially outward from the second base portion 662. Each of the two stair portions 664 is also extended axially outward from the second base portion 662, and disposed aside the protruding portion 663. The stair portion 664 and the protruding portion 663 are both protrusive structures from the second base portion 662, but have different heights. The first cam surface G1 and the third cam surface G3 are different portions of a top surface of the stair portion 664 at different heights. The second cam surface G2 is a top surface of the second base portion 662. In order to contribute better kinematic performance while in transforming the rotational motion into the corresponding linear motion, the inclined cam surface G4 is also a portion of the top surface of the stair portion 664 that connects the first cam surface G1 to the third cam surface G3. In addition, another inclined cam surface G5 is defined to connect the third cam surface G3 to the second cam surface G2. Preferably, an angle of inclination for the surface G4 or G5 is ranging from 20° to 45°. For example, as shown in FIG. 2B, the angle q1 of the inclined surface G4 is 30°, and the angle q2 of the inclined surface G5 is 34°.

The slip ring 64 is rotationally disposed to an outer surface of the clutch cam 66. In other words, an inner surface of the slip ring 64 is contacted with the outer surface of the clutch cam 66. The base portion 634 of the slip-ring actuator 63 is rotationally disposed inside the clutch cam 66, with the protrusive key 642 of the slip ring 64 to be inside the corresponding sliding slot 635 of the slip-ring actuator 63, such that each of the protrusive keys 642 of the slip ring 64 can be displaced between the corresponding two extension portions 664 by slipping along the first cam surface G1, the second cam surface G2 and the third cam surface G3.

Upon the aforesaid arrangement, the guide wheel 11 would drive the guide-wheel adapter 62 to rotate, and the guide-wheel adapter 62 would further rotate the slip-ring actuator 63. Simultaneously, with the cam-and-follower formulation formed by the slip ring 64 having the protrusive keys 642, the clutch cam 66 having the cam surfaces and the slip-ring actuator 63 having the sliding slots, the slip ring 64 can follow the slip-ring actuator 63 to rotate so as to have the protrusive keys 642 to slide along the corresponding cam surfaces (i.e., the first cam surface G1, the second cam surface G2 and the third cam surface G3). Thus, the slip ring 64 would undergo a linear motion to displace the clutch 3 for switching around the plurality of power input/output routes. In this embodiment, while the shift mechanism 6 drives the clutch 3 to generate a corresponding displacement to switch orderly around the first gear (see FIG. 3A or FIG. 3B), the second gear (see FIG. 4A or FIG. 4B) and the third gear (see FIG. 5A or FIG. 5B). In this embodiment, the first gear is a low gear (i.e., a speed-down gear), the third gear is a high gear (i.e., a speed-up gear), and the second gear is to a gear for keeping the input power equal to the output power (1:1).

In this embodiment, while the initial gear is set to the first gear (low gear) shown in FIG. 3A or FIG. 3B, also referring to FIG. 1 and FIG. 2A and FIG. 2B, each of the protrusive keys 642 of the slip ring 64 would contact at the corresponding first cam surface G1, the ring body 641 of the slip ring 64 would contact at the inner surface A1 of the clutch 3, and each of the ring gear pawls 41 would contact at the top portion 32 of the clutch 3, such that the power input/output route E1 corresponding to the first gear, as shown in FIG. 3B, would be established by the transmission member 5, the ring gear 4, the planet gears 22, the planet carrier 21 and the hub 15.

In this embodiment, referring to FIG. 1 and FIG. 2A and FIG. 2B, while the first gear (see FIG. 3A or FIG. 3B) is shifted to the second gear (see FIG. 4A or FIG. 4B), the shift lever is applied to pull tightly the shift cable, so as to rotate the guide wheel 11 toward the first rotational direction R1. Then, the guide wheel 11 would rotate the guide-wheel adapter 62 and further the slip-ring actuator 63. Simultaneously, each of the protrusive keys 642 of the slip ring 64 would slide along the corresponding sliding slot 635 of the slip-ring actuator 63, and thus the slip ring 64 would follow the slip-ring actuator 63 to rotate. By having the slip ring 64 to rotate, each of the protrusive keys 642 would slide from the first cam surface G1, via the inclined cam surface G4, to the third cam surface G3 (see FIG. 2A and FIG. 2B). In comparison to the first cam surface G1, the third cam surface G3 is much closer to the planet carrier 21, so that the slip ring 64 would undergo a linear motion in the first displacement direction L1 from the transmission member 5 toward the planetary gear set 2. As such, the torsional spring 13 would be rotated, and so the compressed clutch spring 12 would displace the clutch 3 toward the planetary gear set 2 to have the inner surface A1 of the clutch 3 to contact the ring body 641 of the slip ring 64. In addition, the top portion 32 of the clutch 3 would be pushed to leave the ring gear pawls 41, such that the top portion 32 of the clutch 3 would leave off the ring gear pawls 41, the inclined portion 33 of the clutch 3 would leave off the ring gear pawls 41, and the clutch 3 is yet to mesh the planet carrier 21. Thereupon, the power input/output route E2 corresponding to the second gear, as shown in FIG. 4B, would be established by the transmission member 5, the ring gear 4 and the hub 15.

In this embodiment, referring to FIG. 1 and FIG. 2A and FIG. 2B, while the second gear (see FIG. 4A or FIG. 4B) is shifted to the third gear (see FIG. 5A or FIG. 5B), the guide wheel 11 is rotated a specific angle toward the first rotational direction R1. Then, the guide wheel 11 would rotate the guide-wheel adapter 62 and further the slip-ring actuator 63. The slip-ring actuator 63 then drives the slip ring 64 to further rotate for another angle so as to have each of the protrusive keys 642 to slide from the third cam surface G3, via the inclined cam surface G5, to the second cam surface G2 (see FIG. 2A and FIG. 2B). In comparison to the third cam surface G3, the second cam surface G2 is much closer to the planet carrier 21, so by having the slip ring 64 to displace a further distance in the first displacement direction L1 from the transmission member 5 toward the planetary gear set 2. As such, the torsional spring 13 would be rotated again, and the contact between the top portion 32 of the clutch 3 and the ring gear pawls 41 would be removed. Also, the contact between the inclined portion 33 of the clutch 3 would leave off the ring gear pawls 41. On the other hand, by having the compressed clutch spring 12 to displace the clutch 3 a further distance toward the planetary gear set 2, then the lateral protrusion 34 of the clutch 3 would be plugged into the corresponding cavity 231 of the clutch ratchet 23 so as to have the clutch 3 to engage the planetary gear set 2. Thereupon, the power input/output route E3 corresponding to the third gear (high gear), as shown in FIG. 5B, would be established by the transmission member 5, the clutch 3, the planet carrier 21 and the ring gear 4.

In this embodiment, the first gear is a low gear, the second gear is a gear to maintain the input power to be equal to the output power (i.e., at a 1:1 ratio), and the third gear is a high gear. In other words, the aforesaid gear shift around the first gear, the second gear and the third gear is a gear-shift process from a low gear to a high gear. Since the shift mechanism 6 applies a rotational motion to have the clutch 3 to generate a linear displacement motion, the guide wheel 11 would rotate the slip ring 64 in the first rotational direction R1 so as to complete the rotational motion, such that the protrusive key 642 would leave the first cam surface G1 to contact the second cam surface G2 (see FIG. 2A and FIG. 2B). In comparison to the first cam surface G1, the second cam surface G2 is much closer to the planet carrier 21. The slip ring 64 undergoes a linear motion in the first displacement direction L1 from the transmission member 5 toward the planetary gear set 2. In addition, while in switching the low gear to the high gear, the compressed clutch spring 12 is used to have the clutch 3 to generate a displacement for switching to the high gear from the low gear, such that effect of the load ratio upon the speed-up gear-shift process can be substantially reduced.

In this embodiment, while the third gear (high gear) of FIG. 5A or FIG. 5B is shifted to the first gear (low gear) of FIG. 3A or FIG. 3B, the shift lever is applied to loosen the shift cable so as to release the potential energy stored in the torsional spring 13 into a corresponding torque or rotational force for resuming the components connected with the torsional spring 13. Thereupon, the shift mechanism 6 is driven to transform the rotational motion into the corresponding linear motion, the torsional spring 13 drives the slip ring 64 to rotate in the second rotational direction R2 so as to perform the rotational motion, and thus the protrusive key 642 slides along from the second cam surface G2, via the inclined cam surfaces G5, G4, to the first cam surface G1 (see FIG. 2A and FIG. 2B). In comparison to the second cam surface G2, the first cam surface G1 is closer to the transmission member 5, but farther away from the planet carrier 21. Therefore, the slip ring 64 drives the planetary gear set 2 to move toward the transmission member 4 in the second displacement direction L2 so as to undergo the linear motion, and to compress the compressed clutch spring 12 so as to have the lateral protrusion 34 of the clutch 3 away from the corresponding cavity 231 of the clutch ratchet 23, so that the clutch 3 is disengaged from the planetary gear set 2 to reach the low gear as shown in FIG. 3A or FIG. 3B.

In summary, in the multi-speed hub gear of this disclosure, since the shift mechanism utilizes a rotational motion to have the clutch to generate a corresponding linear displacement motion, while in shifting the low gear to the high gear, a compressed clutch spring can be used to displace the clutch so as to complete the gear shift. Thereupon, the effect of the load ratio for shifting the low gear to the high gear can be reduced. On the other hand, while in shifting the high gear to the low gear, a torsional spring can rotate reversely the components respective to the shift mechanism. That is, with the torsional spring to push and displace the clutch, the shifting smoothness from the high gear to the low gear can be substantially enhanced.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A multi-speed hub gear, applying a shift lever to shift gears between a high gear and a low gear, the shift lever connecting a shift cable, the multi-speed hub gear comprising:
    an axle;
    a planetary gear set, a clutch, a transmission member and a guide wheel, orderly mounted to the axle, the guide wheel being used for connecting the shift cable, the clutch being disposed between the planetary gear set and the transmission member, wherein the clutch includes a lateral protrusion, the planetary gear set includes a planet carrier and a planet gear, and the planet gear is rotationally connected with and disposed inside the planet carrier;
    a clutch ratchet, disposed at one side of the planet carrier;
    a plurality of pawls, wherein each of the plurality of pawls is pivotally connected with the planet carrier for buckling a corresponding ratchet groove of the clutch ratchet, and the lateral protrusion of the clutch is used for engaging a corresponding cavity of the clutch ratchet;
    a compressed clutch spring, connected with the clutch;
    a shift mechanism, used for transforming a rotational motion into a linear motion; and
    a torsional spring, rotationally connected with the shift mechanism;
    wherein, while in switching the low gear to the high gear, the shift lever pulls tightly the shift cable to rotate the shift mechanism in a first rotational direction for driving the shift mechanism to transform the rotational motion into the linear motion and thus to twist the torsional spring, such that the compressed clutch spring pushes the clutch to displace in a first displacement direction from the transmission member toward the planetary gear set;
    wherein, while in switching the high gear to the low gear, the shift lever loosens the shift cable to have the torsional spring to rotate the shift mechanism in a second rotational direction to transform the rotational motion into the linear motion and thus to displace the clutch in a second displacement direction from the planetary gear set toward the transmission member and to further compress the compressed clutch spring, the first rotational direction and the second rotational direction are reverse to each other, and the first displacement direction and the second displacement direction are linear and reverse to each other.

2. The multi-speed hub gear of claim 1, further including a ring gear, wherein the clutch is disposed inside the ring gear, the ring gear includes a ring gear pawl for contacting the clutch to form a power input/output route corresponding to the low gear, and the power input/output route is formed by the transmission member, the ring gear, the planet gear and the planet carrier; wherein, if the ring gear pawl does not contact the clutch and the lateral protrusion of the clutch does not engage the cavity of the clutch ratchet, another power input/output route corresponding to the high gear is formed by including the transmission member, the clutch, the planet carrier and the ring gear.

3. The multi-speed hub gear of claim 1, wherein the shift mechanism includes:
    a slip ring, disposed inside the clutch, including a ring body and at least a protrusive key, the protrusive key being extended from an inner surface of the ring body; and
    a clutch cam, connected with the planetary gear set, including at least a first cam surface and at least a second cam surface, an axial distance between the second cam surface and the transmission member is greater than an axial distance between the first cam surface and the transmission member, an axial distance between the first cam surface and the planetary gear set is greater than an axial distance between the second cam surface and the planetary gear set, the slip ring being rotationally disposed on an outer surface of the clutch cam, the protrusive key being used for sliding along the first cam surface or the second cam surface;
    wherein, while in switching the low gear to the high gear, the guide wheel drives the slip ring to rotate in the first rotational direction for performing the rotational motion to have the protrusive key to slide along the second cam surface from the first cam surface, and thus the slip ring displaces in the first displacement direction from the transmission member toward the planetary gear set so as to perform the linear motion;
    wherein, while in switching the high gear to the low gear, the torsional spring drives the slip ring to rotate in the second rotational direction to perform the rotational motion and to have the protrusive key to slide along the first cam surface from the second cam surface, and so the slip ring displaces in the second displacement direction from the planetary gear set toward the transmission member to perform the linear motion.

4. The multi-speed hub gear of claim 3, wherein the shift mechanism further includes:
   a guide-wheel adapter, co-moved with the guide wheel; and
   a slip-ring actuator, movably disposed inside the clutch, co-moved with the guide-wheel adapter, including at least a sliding slot for the protrusive key of the slip ring to slide therealong, the guide wheel rotating the guide-wheel adapter to further rotate the slip-ring actuator.

5. The multi-speed hub gear of claim 4, wherein the guide-wheel adapter includes an adapter body, a first connecting pillar and a second connecting pillar, the adapter body is connected between the first connecting pillar and the second connecting pillar, the first connecting pillar is connected with the guide wheel, and the second connecting pillar is used for engaging a corresponding positioning hole of the slip-ring actuator.

6. The multi-speed hub gear of claim 5, further including a bearing seat fixed to the axle, the bearing seat having an arc-shaped slot, the first connecting pillar orderly penetrating through the arc-shaped slot and the mounting hole of the guide wheel; wherein, when the guide wheel rotates, the guide-wheel adapter moves together with the guide wheel, and the first connecting pillar of the guide-wheel adapter is movable along the arc-shaped slot.

7. The multi-speed hub gear of claim 3, wherein the clutch cam further includes at least a third cam surface disposed between the first cam surface and the second cam surface, the third cam surface and the first cam surface are connected through an inclined surface having an angle of inclination ranging from 20° to 45°, and the third cam surface and the second cam surface are connected through another inclined surface having another angle of inclination ranging from 20° to 45°.

* * * * *